(12) United States Patent
Heilman et al.

(10) Patent No.: US 6,730,818 B2
(45) Date of Patent: May 4, 2004

(54) ETHYLENE ALPHA-OLEFIN POLYMERS, PROCESS AND USES

(75) Inventors: William J. Heilman, Houston, TX (US); I-Ching Chiu, Houston, TX (US); James C. W. Chien, Walnut Creek, CA (US)

(73) Assignee: Penzoil-Quaker State Company, Houston, TX (US)

( * ) Notice: Subject to any disclaimer, the term of this patent is extended or adjusted under 35 U.S.C. 154(b) by 0 days.

(21) Appl. No.: 10/154,037

(22) Filed: May 22, 2002

(65) Prior Publication Data

US 2002/0193647 A1 Dec. 19, 2002

Related U.S. Application Data

(63) Continuation of application No. 09/596,481, filed on Jun. 19, 2000, and a continuation of application No. 08/880,151, filed on Jun. 20, 1997, now Pat. No. 6,124,513.

(51) Int. Cl.[7] .................................. C07C 9/00
(52) U.S. Cl. ............................. 585/12; 585/10; 585/18
(58) Field of Search .............................. 526/347, 348.2; 585/12, 10, 18

(56) References Cited

U.S. PATENT DOCUMENTS

| | | |
|---|---|---|
| 3,345,426 A | 10/1967 | Langer |
| 3,437,462 A | 4/1969 | Maloney et al. |
| 3,437,464 A | 4/1969 | Maloney |
| 3,442,839 A | 5/1969 | Gerhart et al. |
| 3,496,129 A | 2/1970 | Wismer |
| 3,598,552 A | 8/1971 | Cohen et al. |
| 3,600,451 A | 8/1971 | Rowe |
| 3,676,521 A | 7/1972 | Stearns et al. |
| 3,850,586 A | 11/1974 | Iwama et al. |
| 3,912,788 A | 10/1975 | Farona et al. |
| 3,923,919 A | 12/1975 | Stearns |
| 4,137,274 A | 1/1979 | Mikulicz |
| 4,231,883 A | 11/1980 | Malec |
| 4,377,720 A | 3/1983 | Langer |
| 4,404,344 A | 9/1983 | Sinn et al. |
| 4,413,156 A | 11/1983 | Watts, Jr. et al. |
| 4,463,201 A | 7/1984 | Schick et al. |
| 4,507,515 A | 3/1985 | Johnston et al. |
| 4,510,342 A | 4/1985 | Currie et al. |
| 4,542,199 A | 9/1985 | Kaminsky et al. |
| 4,547,202 A | 10/1985 | Miller |
| 4,621,111 A | 11/1986 | Duvdevani et al. |
| 4,658,078 A | 4/1987 | Slaugh et al. |
| 4,666,619 A | 5/1987 | Kresge et al. |
| 4,668,834 A | 5/1987 | Rim et al. |
| 4,704,491 A | 11/1987 | Tsutsui et al. |
| 4,769,510 A | 9/1988 | Kaminsky et al. |
| 4,789,714 A | 12/1988 | Cozewith et al. |
| 4,794,096 A | 12/1988 | Ewen |
| 4,804,794 A | 2/1989 | Ver Strate et al. |

(List continued on next page.)

FOREIGN PATENT DOCUMENTS

| | | |
|---|---|---|
| CA | 2000182 | 4/1990 |
| DE | 1939037 | 1/1971 |
| EP | 21634 | 1/1981 |
| EP | 035242 | 9/1981 |
| EP | 069951 | 1/1983 |
| EP | 200351 | 11/1986 |
| EP | 332243 | 9/1989 |
| EP | 586777 A1 | 3/1994 |
| EP | 620264 | 10/1994 |
| FR | 1492025 | 11/1967 |
| GB | 1033456 | 6/1966 |
| GB | 1525599 | 9/1978 |
| SU | 732364 | 5/1980 |
| WO | WO 87/03610 | 6/1987 |
| WO | WO 9533781 | 12/1995 |
| WO | WO 9744370 | 11/1997 |
| WO | WO 9748741 | 12/1997 |
| WO | WO 98/37109 | 8/1998 |

OTHER PUBLICATIONS

Chien et al., Polymerization of Propylene by Zirconocenium Catalysts with Different Counter–ions, *J. Polymer Sci.: Part A: Polymer Chemistry*, vol. 32, pp. 2387–2393, 1994.

Shaffer et al., Noncoordinating Anions in Carbocationic Polymerization, *J. Polymer Sci.: Part A: Polymer Chemistry*, vol. 35, pp. 329–344, 1997.

Barsan et al., The First Example of Polymerization of Isobutylene induced by a Metallocene–like Initiator, ($\eta^5$—$C_5Me_5$)$TiMe_2$[($\mu$–Me)B($C_6F_5$)$_3$], *J. Chem. Soc., Chem. Commun.*, pp. 1065–1066, 1995.

Barsan et al., Polymerization of Isobutylene and the Copolymerization of Isobutylene and Isoprene Initiated by the Metallocene Derivative, *Macromolecules*, vol. 31, No. 24, pp. 8439–8447, 1998.

Quyoum et al., $\eta^5$—$C_5Me_5TiMe_3B(C_6F_5)_3$: A Carbocationic Olefin Polymerization Initiator Masquerading as a Ziegler–Natta Catalyst, *J. Am. Chem. Soc.*, vol. 116, pp. 6435–6436, 1994.

Carr et al., Zirconocenes as Initiators for Carbocationic Isobutene Homo– and Copolymerizations, *Macromolecules*, vol. 31, pp. 2035–2040, 1998.

Primary Examiner—Jacqueline V. Howard

(57) ABSTRACT

A novel series of copolymers and terpolymers, useful as base oils for synthetic lubricants, are produced by polymerization of ethylene, an alpha-olefin, and optionally a third monomer comprising an alpha-olefin of 3 to 20 carbon atoms, in the presence of a combination catalyst comprising a compound of a transition metal of Group IVb of the Periodic Table and an aluminoxane. The copolymer or terpolymer may be further processed by thermal cracking to yield novel cracked polymers, and the cracked polymers may be hydrogenated. The copolymers or terpolymers may also be hydroisomerized. All the polymers are useful as base oils for lubricating oils and consumer products.

29 Claims, No Drawings

U.S. PATENT DOCUMENTS

| | | |
|---|---|---|
| 4,855,526 A | 8/1989 | Hen |
| 4,874,820 A | 10/1989 | Cozewith et al. |
| 4,922,046 A | 5/1990 | Kinoshita et al. |
| 4,960,875 A | 10/1990 | Kinoshita et al. |
| 4,962,248 A | 10/1990 | Winter et al. |
| 4,990,709 A | 2/1991 | Wu |
| 5,043,515 A | 8/1991 | Slaugh et al. |
| 5,068,476 A | 11/1991 | Wu et al. |
| 5,087,788 A | 2/1992 | Wu |
| 5,151,204 A | 9/1992 | Struglinski |
| 5,171,919 A | 12/1992 | Watanabe et al. |
| 5,217,636 A | 6/1993 | Paboucek |
| 5,276,227 A | 1/1994 | Wu et al. |
| 5,296,515 A | 3/1994 | Johnson et al. |
| 5,321,107 A | 6/1994 | Tsutsui et al. |
| 5,324,800 A | 6/1994 | Welborn, Jr. et al. |
| 5,330,666 A | 7/1994 | Habeeb |
| 5,444,145 A | 8/1995 | Brant et al. |
| 5,446,221 A | 8/1995 | Struglinski |
| 5,451,630 A | 9/1995 | Olivier et al. |
| 5,543,469 A | 8/1996 | Struglinski et al. |
| 5,554,310 A | 9/1996 | Rossie et al. |
| 5,557,023 A | 9/1996 | Somogyvari et al. |
| 5,763,556 A | 6/1998 | Shaffer et al. |
| 5,866,665 A | 2/1999 | Shaffer et al. |
| 6,124,513 A * | 9/2000 | Heilman et al. ............... 585/12 |
| 6,262,324 B1 * | 7/2001 | Heilmann et al. ............ 585/12 |
| 6,344,515 B1 * | 2/2002 | Parikh et al. ............... 524/578 |
| 6,388,148 B2 * | 5/2002 | Heilmann et al. ............ 585/12 |
| 6,417,416 B1 * | 7/2002 | Heilman et al. .............. 585/12 |

* cited by examiner

ETHYLENE ALPHA-OLEFIN POLYMERS, PROCESS AND USES

PRIOR RELATED APPLICATIONS

This application is a continuation application of U.S. application Ser. No. 09/596,481, filed on Jun. 19, 2000, and previously filed U.S. application Ser. No. 08/880,151, filed on Jun. 20, 1997, now U.S. Pat. No. 6,124,513 issued on Sep. 26, 2000, both of which are incorporated by reference in their entirety herein.

FEDERALLY SPONSORED RESEARCH STATEMENT

Not Applicable.

REFERENCE TO MICROFICHE APPENDIX

Not Applicable.

FIELD OF THE INVENTION

This invention relates to ethylene-olefin polymers, processes for their production, and uses thereof as low molecular weight liquid or wax-like products.

BACKGROUND OF THE INVENTION

Increasing demand in the oil industry has created a need for a high performance synthetic base oils with low volatility and high oxidative stability. Currently, poly-alpha-olefins (PAO) are used as synthetic base oils but costs are high. This has created a demand for a low cost alternative to PAO such as synthetic hydrocarbons with equivalent or better properties. The present invention is based, in part, on the surprising and unexpected discovery that synthetic base oils may be formulated directly into motor oils or fractionated into different viscosity grade oils with properties equivalent to commercial PAO.

Various prior art publications are available relating to poly-alpha-olefin polymers. Reference may be made to U.S. Pat. Nos. 4,668,834, 4,542,199, 5,446,221, 4,704,491, 4,377,720, 4,463,201, 4,769,510, 4,404,344, 5,321,107, 5,151,204, 4,922,046, 4,794,096, 4,668,834, 4,507,515, and 5,324,800. Many of these prior art patents involve polymerization of ethylene or poly-alpha-olefins using a catalyst combination comprising a transition metal complex and an aluminoxane.

The present invention provides polymers of poly-olefins which have a high viscosity index, low pour point, low cold cranking viscosity, high fire point and excellent oxidation stability.

SUMMARY OF THE INVENTION

It is accordingly an object of the present invention to provide a novel series of ethylene-olefin copolymer and terpolymer compositions useful as base oils for the production of synthetic lubricating oils.

A further object of the invention is to provide a process for the production of copolymers of ethylene and olefins and the resulting polymers which have a high viscosity index, low pour point, and low cold cranking viscosity.

A still further object of the present invention is to provide a process for the preparation of terpolymers of ethylene, an olefin and a third monomeric reactant, which terpolymers have unique characteristics as synthetic base oils.

An even further object of the present invention is to provide a series of novel polymeric products obtained by thermal cracking of the copolymers and terpolymers of the invention and processes for the production therefor.

A still further object of the invention is to provide a series of polymeric products which are the hydrogenated products of the thermal cracking procedure and processes for the production thereof.

A further object of the invention is to provide synthetic base oils for the production of synthetic lubricants.

A further object is to provide novel liquid and wax-like products for the cosmetic, textile, household, and personal care industries.

Further objects and advantages of the present invention will become apparent as the description thereof proceeds.

In satisfaction of the foregoing objects and advantages, the present invention provides a process for the production of an ethylene-olefin copolymer, comprising the steps of:

a) polymerizing ethylene and at least one olefin in the presence of a cocatalyst combination comprising a compound of a transition metal of Group IVb of the Periodic Table and an aluminoxane to produce a copolymer; and optionally, b) subjecting at least a portion of said copolymer to thermal cracking to produce a cracked hydrocarbon, or hydroisomerizing said copolymer to produce an isomerization hydrocarbon product.

The present invention also provides novel copolymers obtained from the polymerization process and the novel thermally cracked product. The present invention also includes hydrogenation of the polymer obtained from the thermal cracking process to produce a hydrogenated copolymer.

The copolymer produced by the reaction of ethylene and an olefin in the process of the invention may be characterized as follows:

(a) % ethylene of from 50 to 75%;

(b) molecular weight of <2000;

(c) molecular weight distribution of <2.5;

(d) bromine number of <53;

(e) a head to tail molecular structure; and (f) a pour point of below about 0° C.

In a further embodiment, the present invention also provides a process for the production of a terpolymer by reaction under polymerization conditions of ethylene, at least one olefin monomer different from ethylene, and at least one third monomer comprising an ethenically unsaturated hydrocarbon such as an olefin having a carbon chain length of greater than three, in the presence of a catalyst combination comprising a compound of a transition metal of Group IVb of the Periodic Table and an aluminoxane. Also provided is the novel terpolymer produced as a result of this process. This novel terpolymer may also be thermally cracked and hydrogenated, or hydroisomerized.

BRIEF DESCRIPTION OF THE DRAWINGS

Not applicable.

DETAILED DESCRIPTION OF THE INVENTION

The present invention relates in one embodiment to a process for producing copolymers of ethylene and an olefin polymer, comprising polymerizing ethylene and one or more olefin monomers having 3 to 20 carbon atoms under polymerization conditions in the presence of a catalyst combination comprising a compound of a transition metal of Group IVb of the Periodic Table and an aluminoxane. In a further embodiment, this obtained copolymer is subjected to thermal cracking or hydroisomerization, and optionally, the cracked polymer is subjected to hydrogenation.

This invention further concerns a process for producing an ethylene-olefin polymer, comprising the steps of polymerizing ethylene and one or more olefin monomers having 3 to 20 carbon atoms in the presence of a catalyst combination comprising a compound of a transition metal of Group IVb of the Periodic Table, and an aluminoxane, and hydroisomerizing the obtained polymer.

By ethylene-olefin polymer, there is meant a copolymer obtained by reaction of an ethylene monomer and one or more additional olefin monomers of suitable reactivity. The ethylene-olefin polymer may be, for example, a copolymer, a terpolymer, a tetrapolymer, etc., depending on the number of monomers reacted in the process.

In one embodiment of the process of this invention, the starting material to be fed to the polymerization reaction system is a mixture of ethylene (ethene) and one or more olefins having about 3 to 20 carbon atoms. The content of ethylene in the starting material is preferably about 2 to 80 mole %, preferably about 4 to 55 mole %, and the content of the olefin is preferably about 20 to 98 mole %, preferably about 35 to 96 mole %.

Specific examples of the one or more olefins having 3 to 20 carbon atom which may be used as a starting material in the process of this invention are 1 propene (propylene), 1-butene, 1-hexene, 4-methyl-1-pentene, 1-octene, 1-decene, 1-dodecene, 1-tetradecene, 1-hexadecene, 1-octadecene, 1-eicocene, styrene and α-methylstyrene, 2-methyl-1-butene, 2-methyl-1-hexene, 3-methyl-1-butene, 4 methyl-1-pentene, 2-methyl-1-pentene, 2-methyl-1-propene.

The catalyst combinations used in the polymerization processes of the present invention are well known as catalysts for such polymerization reactions. Such catalysts comprise preferably the combination of (a) metallocene compounds which are compounds of a transition metal of Group IVb of the Periodic Table and (b) an aluminoxane.

Such metallocene compounds are preferably tri- and tetravalent metals having one or two hapto $\eta^5$-ligands selected from the group comprising cyclopentadienyl, indenyl, fluorenyl with the maximum number of hydrogen substituted with alkyl, alkenyl, aryl, alkylaryl, arylakyl or benzo radicals to none. When there are two $\eta^5$-ligands, they may be the same or different which are either connected by bridging groups, selected from the group comprising, $C_1-C_4$ alkylene, $R_2Si$, $R_4Si_2$, $R_2Si-O-Si-R_2$, $R_2Ge$, $R_2P$, $R_2N$ with R being hydrogen, alkyl or aryl radicals, or the two $\eta^5$-ligands are not connected. The non-hapto ligands are either halogen or R, there are two or one such ligands for the tetravalency or trivalency transition metal, respectively. Where there is only one hapto-$\eta^5$-ligands, it can be selected from the group comprising cyclopentadienyl, indenyl, fluorenyl with from the maximum number of hydrogen substituted with R or benzo radicals or to none. The transition metal will have three or two non-hapto ligands in the +4 and +3 oxidation state, respectively. One hydrogen of the hapto ligand may be substituted with a heteratom moiety selected from the group NR, $NR_2$, PR, $PR_2$, which are connected by $C_1-C_4$ alklene, $R_2Si$, $R_4Si_2$ to the $\eta^5$-ring. The appropriate number of non-hapto ligands is three for tetravalent metal in the case of coordinate bondings $NR_2$ or $PR_2$ moiety and one less non-hapto ligands for the trivalent metal. These numbers are decreased by one in the case of covalent bonding NR or PR moieties.

Illustrative but not limiting examples of titanium compounds comprise bis-(cyclopentadienyl)dimethyltitanium, bis-(cyclopentadienyl) diisopropyltitanium, bis (cyclopentadienyl) dimethyltitanium, bis(cyclopentadienyl) methyltitanium monochloride, bis(cyclopentadienyl) ethyltitanium monochloride, bis(cyclopentadienyl) isopropyltitanium monochloride, bis(cyclopentadienyl)titanium dichloride, dimethylsilylene (1-$\eta^5$-2,3,4,5-tetramethylpentadienyl) (t-butylamido) titanium dichloride, 2-dimethyl aminoethyl-$\eta^5$-cyclopentadienyl titanium dichloride.

Illustrative but not limiting examples of zirconium compounds comprise as bis(isopropylcyclopentadienyl) zirconium dichloride, bis(cyclopentadienyl) dimethylzirconium, bis(cyclopentadienyl)-diethylzirconium, bis(methylcyclopenta-dienyl) diisopropylzirconium, bis(cyclopentadienyl) methylzirconium monochloride, bis(cyclopentadienyl)ethylzirconium monochloride, bis(cyclopentadienyl)zirconium dichloride, rac-ethylene bis(1-$\eta^5$-indenyl) zirconium dichloride, rac-ethylene bis(1-$\eta^5$-indenyl) zirconium dichloride, rac-ethylene bis(1-$\eta^5$-4,5,6,7-tetrahydroindenyl) zirconium dichloride and isopropylidene-(1-$\eta^5$-cyclopentadienyl) (9-$\eta^5$-fluoronyl) zirconium dichloride.

Specific examples of hafnium compounds comprise bis (cyclo-pentadienyl)dimethylhafnium, bis(cyclopentadienyl) methylhafnium monochloride, and bis(cyclopentadienyl) hafnium dichloride.

The aluminoxane co-catalyst useful in the catalysts of the present invention are polymeric aluminum compounds which can be represented by the general formulae (R—Al—O)$_n$ which is a cyclic compound and R(R—Al—O—)$_n$ AlR$_2$, which is a linear compound. In the general formula R is a $C_1-C_5$ alkyl group such as, for example, methyl, ethyl, propyl, butyl and pentyl and n is an integer from 1 to about 20. Most preferably, R is methyl and n is about 4. Generally, in the preparation of alumoxanes from, for example, aluminum trimethyl and water, a mixture of the linear and cyclic compounds is obtained.

The proportion of the catalyst comprising a compound of a transition metal of Group 1 Vb of the Periodic Table may be, for example, $10^{-8}$ to $10^{-2}$ gram-atom/liter, preferably $10^{-7}$ to $10^{-3}$ gram-atom/liter, as the concentration of the catalyst comprising a compound of a transition metal in the polymerization reaction. The proportion of the aluminoxane used may be, for example, $10^{-4}$ to $10^{-3}$ gram-atom/liter, preferably $10^{-3}$ to $5 \times 10^{-2}$ gram-atom/liter, as the concentration of the aluminum atom in the polymerization reaction. The ratio of the aluminum atom to the transition metal in the polymerization reaction system may be, for example, in the range of 25 to $10^6$, preferably 50 to $10^4$. The molecular weight of the polymer may be controlled by using hydrogen, and/or by adjusting the polymerization temperature, or by changing the monomer concentrations.

The copolymerizations and terpolymerizations could also be performed using other co-catalysts, without $R_3Al$ (*Journal of Polymer Science: Part A: Polymer Chemistry*, Vol. 32, 2387–2393 (1994)).

While the above description represents preferred catalysts for use in the invention, equivalent catalysts and combinations may also be used to effect the olefin polymerization.

The polymerization reaction in the process of this invention may be carried out in absence of a solvent or in a hydrocarbon solvent. Examples of a hydrocarbon solvent suitable for this purpose are aliphatic hydrocarbons such as butane, isobutane, pentane, hexane, octane, decane, dodecane, hexadecene and octadecane; alicyclic hydrocarbons such as cyclopentane, methylcyclopentane, cyclohexane and cyclooctane; aromatic hydrocarbons such as benzene, toluene and xylene; and petroleum fractions such a gasoline, kerosene, lubricant base stocks and light oils. The starting olefins may themselves serve as the hydrocarbon medium. Among these hydrocarbon media, the aromatic hydrocarbons and the starting olefins may be preferably used in the process of this invention.

The polymerization temperature in this first step of the process of the invention may range, for example, from about 0° C. to about 200° C., preferably from about 40° C. to about 120° C.

When the polymerization reaction in the process of this invention is carried out in the absence of hydrogen, a liquid copolymer having a high bromine value is obtained which contains unsaturation (double bonds). This copolymer is usually a high molecular weight copolymer. When the polymerization is carried out in the presence of hydrogen, a liquid polymer having a low bromine value or a bromine value of substantially zero may be obtained. Some unsaturation may be present. The hydrogen is used to control (lower) the molecular weight of the copolymer. Excess solvent may be removed by evaporation and a light copolymer (boiling point below 700° F. in ASTM D-2887 Simulated Distillation) is recovered by distillation under vacuum.

The product resulting from this copolymerization reaction of ethylene monomer and an olefin monomer different from ethylene is a copolymer suitable as a base oil for synthetic lubricants. The polymer may be characterized as containing from 50 to 75% ethylene, having a molecular weight in excess of 1000, a mole weight distribution in excess of 2, a bromine number in excess of 2, and a molecular structure which is head to tail with a random monomer distribution.

In a preferred further embodiment of the invention, a third monomeric reactant different from ethylene and the olefin polymer, may be included in the initial polymerization reaction to form a terpolymer product. This third component must contain unsaturation so that polymerization can occur and is selected from the group consisting of olefins having 4 to 20 carbon atoms.

Preferred reactants are olefins of 4 to 12 carbon atoms such as 1-butene, 1-pentene, 1-hexene, 1-heptene, 1-octene, 1-decene, 1-undecene and 1-dodecene, 2-methyl-1-pentene, styrene, α-methylstyrene, 2-methyl-1-butene, 3-methyl-1-butene, 4-methyl-1-pentene, 2-methyl-1-pentene, 2-methyl-1-propene.

In conducting the reaction with the third monomeric reactant, it is preferred to use about 0.1 up to 40 mole percent, preferably about 1 to 20 mole percent of the third monomer, based on the total composition.

The terpolymer produced in this embodiment of the invention may be characterized as a liquid terpolymer of ethylene, a first olefin different from ethylene, and a second olefin different from ethylene and the first olefin, preferably having 4 to about 20 carbon atoms; and characterized by:

(a) % ethylene of from 10 to 80%;
(b) % of said first olefin of from 14 to 80%;
(c) % of said second olefin of from 1% to 10%,
(d) molecular weight of 300–10,000;
(e) molecular weight distribution of <2.5; and a
(f) bromine number in the range of 0 to 53.

The terpolymer resulting from reaction using the third monomer reactant is also useful as a synthetic base oil for synthetic lubricants and as a white oil for use in cosmetics and medicines. The third monomer provides a beneficial effect by lowering the pour point of the final base oil.

The presence of the third monomer during the polymerization reaction may require a change in catalyst or polymerization reaction conditions. Obviously, other and additional different monomers may be included in the reaction to produce tetrapolymers, etc.

In a further embodiment of the invention, the intermediate copolymer or terpolymer resulting from the polymerization reaction, is subjected to cracking, preferably thermal cracking. As noted above, once the polymerization reaction is completed, excess solvent is removed and those polymers having boiling points below about 700° F. in ASTM D-2887 Simulated Distillation are recovered by distillation. The catalyst may be washed from the copolymer or terpolymer with an aqueous base (e.g., 1 M NaOH) or acid (e.g., 1 M HCl). The resulting copolymer or terpolymer product is then subjected to cracking, preferably under thermal conditions but catalytic cracking could be used as is known in the art. The thermal cracking process is carried at a temperature range of from about 250° C. to about 550° C., preferably from about 350° C. to about 450° C.

The pressure in the cracking step of the invention may range, for example, from about 0.1 to 30 mm Hg vacuum pressure, preferably from about 0.2 to about 10 mm Hg vacuum pressure.

The cracked product in liquid form may optionally be washed with an aqueous base or aqueous acid, and water. Preferably, the cracked feed is washed with aqueous 1 M NaOH, followed by large quantities of water.

As a result of the thermal cracking process, there is produced a copolymer or terpolymer or segments thereof which contain unsaturation (double bonds). The thermally cracked polymeric product is also useful as a synthetic base oil for synthetic lubricants.

The cracked liquid copolymer may be described as a liquid copolymer of ethylene and an olefin, said copolymer being characterized by:

(a) %ethylene of from 10 to 75%;
(b) molecular weight of <2000;
(c) molecular weight distribution of <2;
(d) bromine number of <53; and
(e) a head to tail molecular structure.

The cracked liquid terpolymer may be described as a liquid terpolymer of ethylene, a first olefin, and a second olefin having 3 to about 20 carbon atoms; said terpolymer being characterized by:

(a) % ethylene of from 10 to 80%;
(b) % of said first olefin of from 14 to 80%;
(c) % of said second olefin of from 1% to 10%;
(d) molecular weight of 300–10,000;
(e) molecular weight distribution of <2.5; and a
(f) bromine number in the range of 0 to 53.

In the thermal cracking process, the polymer appears to crack or separate substantially in the center of the polymer. These are narrow molecular weight range products particularly useful as 2, 4 and 6 centistoke oils. For example, in a polymer having a molecular weight of about 1200, the resulting cracked products will have two segments of about 600 molecular weight each. Also, after cracking, the segments will not exclusively exhibit vinylidene unsaturation but rather will have allyl unsaturates and some internal double bonds.

The bromine number of a preferred hydrogenated cracked hydrocarbon product will range from 0 up to 1.0, the kinematic viscosity at 100° C. will range from 2 to 16 cSt, the viscosity index will range from 140 to 160, and the pour point will be below 0° C.

In a further embodiment, the cracked product is then hydrogenated by reaction with hydrogen gas in the presence of a catalytic amount (0.1 to 5 wt. %) of a catalyst. Examples of suitable hydrogenating catalysts are metals of Group VIII of the Periodic Table such as iron, cobalt, nickel, rhodium, palladium and platinum. These catalysts are deposited on alumina, on silica gel, or on activated carbon in preferred embodiments. Of these catalysts, palladium and nickel are preferred. Palladium on activated carbon and nickel on kieselguhr are especially preferred.

The hydrogenation reaction is carried out in the presence or absence of solvents. Solvents are necessary only to increase the volume. Examples of suitable solvents are hydrocarbons such as pentane, hexane, heptane, octane, decane, cyclohexane, methycyclohexane and cyclooctane aromatic hydrocarbons such as toluene, xylene or benzene. The temperature of the hydrogenation reaction may range, for example, from about 150° C. to about 500° C., preferably from about 250° to about 350° C. The hydrogenation reaction pressure may be, for example, in the range of 250–1000 psig hydrogen. The hydrogenated polymeric product is then recovered by conventional procedures. In the hydrogenated product, the double bonds formed in the cracking step have been hydrogenated so that the polymer is a separate type of product. The hydrogenated product will have a molecular weight ranging from about 300 to 1000 and a kinematic viscosity @ 100° C. of about 6–16 centistokes.

In a further embodiment of the present invention, the resulting ethylene-olefin polymer or terpolymer can be hydroisomerized in the presence of a catalytic amount (0.1 to 5 wt. %) of an acidic hydroisomerization catalyst. The hydroisomerization temperature used in this process ranges from about 250° C. to about 550° C., preferably from about 150° C. to about 300° C.

The pressure in the hydroisomerization process may range, for example, from about 250 to 1000 psig hydrogen pressure, preferably from about 300 to about 500 psig hydrogen pressure. In the resulting hydroisomerized product, the carbon moieties have been rearranged into a different molecular structure.

Examples of the acidic hydroisomerization catalysts include transition metals of Groups VI to VIII of the Periodic Table, their oxides, or the combination of metal and metal oxide supported on acidic molecular sieves. The metals include Pd, Ni, Pt, Mo. Metal oxides include PdO, NiO, $MoO_3$. Molecular sieves include synthetic zeolites, such as zeolite A, L, X, Y, and natural zeolites, such as mordentie, chabazite, eriomite, and clinoptilolite. Preferred hydroisomerization catalysts include Pd supported on acidic zeolite X, $Ni/MoO_3$ on zeolite and Ni/NiO on zeolite.

The polymer products of the invention are useful as synthetic lubricating base oils. The base oils of the invention are comparable or improved in lubricating properties, but are less expensive to produce, than poly-alpha-olefins which are currently used commercially as synthetic lubricants.

The synthetic base oils of the invention may be formulated with from about 0.1% up to about 5 wt. % of one or more conventional lubricating oil additives. Such additives comprise detergent packages, pour point depressants, viscosity index improvers and other additives such as anti-oxidants, additives with a detergent action, viscosity increasing compounds, anti-corrosives, anti-foaming agents, agents to improve the lubricating effect and other compounds which are usually added to lubricating oils.

The following examples are presented to further illustrate the invention but are not considered to limit the scope of the invention in any manner whatsoever.

EXAMPLE 1

Preparation of ethylene-propylene polymer

A 4-liter autoclave reactor (using two 2-liter autoclave reactors connected in series) was thoroughly purged with nitrogen and was charged with 300 ml of dried toluene (dried over potassium). Ethylene, propylene and hydrogen were simultaneously and continuously fed through a mass flow controller into the bottom of the reactor at a ratio of 2000 cc/min, 1900 cc/min, and 240 cc/min, respectively. Methylaluminoxane 1.5 mg-atom/hour based on Al content in toluene solution and bis(isopropylcyclopentadienyl) zirconium dichloride $15 \times 10^{-3}$ mg-atom/hour based on Zr content in toluene solution were simultaneously and continuously pumped into the reactor. The ethylene and propylene were polymerized at 50° C. and 15 psig pressure. Throughout the reaction run, the temperature was maintained at +/−2° C. by a heat transfer fluid being circulated through a coil tubing inside the reactor. The excess monomers and hydrogen were continuously vented out at 0.4 cubic feet per hour to maintain a constant gas concentration in the reactor.

The resulting polymer solution was continuously transferred from the reactor to a collection vessel. The pressure was controlled by a back-pressure valve (15 psig). The product, along with toluene, was withdrawn from the collector, and the toluene was removed on a rota-evaporator. The product was washed with aqueous 1 M NaOH, followed by washing with a large quantity of water. A clear liquid polymer (245 grams per hour) was obtained. The obtained liquid polymer had a kinematic viscosity of 40 cSt at 100° C. and viscosity index of 173, Mn of 1400, Mw/Mn of 2.44, bromine number of 4.7. The obtained copolymer contained 62% ethylene.

EXAMPLE 2

The procedure was essentially the same as Example 1, except the polymerization conditions and the feed ratio of ethylene/propylene were changed. The results and properties of the product are summarized in Table 1.

TABLE 1

| Polymerization conditions and products properties | | |
|---|---|---|
| Example | 1 | 2 |
| Reactor Vol., L | 4 | 2 |
| Propylene, cc/min | 1990 | 2000 |
| Ethylene, cc/min | 2000 | 1400 |
| Hydrogen, cc/min | 240 | 20 |
| MAO, Al mg-atom/h | 1.5 | 1.5 |
| (i-PrCp)$_2$ZrCl$_2$, Zr mg-atom/h | $1.5 \times 10^3$ | $1.5 \times 10^3$ |
| Polymerization Temperature, ° C. | 50 | 90 |
| Polymerization Pressure, psig | 15 | 30 |
| Mn | 1400 | 1300 |
| Mw/Mn | 2.37 | 2.41 |
| Ethylene mole % in Copolymer | 62 | 63 |
| Yield, grams/hour | 245 | 153 |
| Simulated Distillation % off at 700° F. | 10 | 8.6 |
| Kinematic Viscosity @ 100° C., cSt | 40 | 33 |
| Viscosity index | 173 | 176 |
| Bromine Number | 4.7 | 8.5 |

EXAMPLE 3

Thermal Cracking

The light polymers produced in Example 1 (boiling point below 700° F. in ASTM D-2887 Simulated Distillation)

were distilled under vacuum. The remaining viscous oils (500 grams) were placed in a round-bottom flask connected to a short-path distillation column and a receiver. The contents were heated at 350° to 450° C. at 0.2 to 2 mm Hg vacuum pressure. The liquid polymers were thermally cracked inside the flask. Once the polymer pyrolized, the cracked polymers were simultaneously evaporated at this temperature range under reduced pressure, and condensed in the receiver to give 420 grams of clear oil. About 15 grams of polymer were left in the flask with the remaining catalysts. The condensed cracked product was characterized by Mn, 797; Mw/Mn, 1.34; kinematic viscosity at 100° C., 7.29 cSt; VI, 160; bromine number, 18.9.

EXAMPLE 4

Hydrogenation

Method A

A portion of the cracked product from Example 1 and 1 weight percent of Pd/C powder were placed in a Zipperclave reactor and filled with 500 psig hydrogen. After agitation for 7 hours at 250° C., the reactor was cooled at room temperature. The catalyst was filtered through celite under reduced pressure to give a clear colorless liquid oil having a bromine number. of less than 0.1. C-13 NMR: peak at δ11.4 ppm. proves the presence of iso-butyl groups.

Method B

A stainless steel column (½ in×2 feet) was filled with 45.9 grams of Ni-Kieselguhr pellets. A portion of the cracked oils from Example 2 were continuously pumped upward at a rate of 1.5 ml/min. through the column at 350° C. (inside temperature) and 750 psig hydrogen. The hydrogen also flowed upward through the column from a separate line. The hydrogenated products were collected at the other end of column to give a clear colorless liquid oil having a bromine number of less than 0.1. The C-13 NMR: peak at δ11.4 ppm. proves the presence of iso-butyl groups.

EXAMPLE 5

Hydroisomerization

Method A

Hydroisomerization on a portion of the cracked product of Example 1 was performed in the same equipment using the same procedure as described in Method B of Example 4, except the Ni-Kieselguhr catalyst was replaced by 32 grams of Pd supported acidic molecular sieve (an x-type zeolite). The Pd supported zeolite was prepared by the treatment of molecular sieve X13 (50 grams) with NH$_4$Cl (13 grams) and Pd(NH$_3$)$_2$Cl$_2$(1 gram) in aqueous solution at 90° C. After the separation of the water, the treated zeolite was then calcined at 450° for 4 hours. The hydroisomerization was carried out at 280° C. and 350 psig of hydrogen pressure. The hydroisomerized product is a clear colorless liquid having a bromine number of <0.1; C-13 NMR showed the characteristic internal ethyl group at δ10.9 ppm and the characteristic terminal ethyl group at δ11.4 ppm. High resolution C-13 NMR also revealed that there are at least six different methyl-carbon signals at 14.16, 14.21, 14.42, 14.45, 14.58, and 14.63 ppm.

Method B

Method A was repeated on a portion of the cracked product of Example 1 but using the commercially available Pd supported zeolite. There was obtained an isomerized colorless liquid having a bromine number of <0.1.

EXAMPLE 6

The hydrogenated cracked oil obtained in Example 4 was formulated by the addition of commercial additives into a 5W30 grade motor oil. The formulation and the resulting physical properties are shown in Table II and compared with a commercial synthetic 5W-30 oil made from poly-alpha-olefins. In Table II, DI is a detergent inhibitor package and a VI improver is a viscosity index improver.

TABLE II

|  | 5W30 From Example 4 Wt % | Commercial Synthetic 5W-30 Wt % |
|---|---|---|
| Components |  |  |
| Synthetic Basestock—Example 4 | 71.29 | 0 |
| Synthetic Ester | 11.39 | 12.06 |
| PAO 8 | 0 | 39.17 |
| PAO 4 | 0 | 30.79 |
| DI Package | 11.40 | 11.56 |
| VI Improver | 5.82 | 6.32 |
| Pour Point Depressant | 0.1 | 0.1 |
| Physical Properties |  |  |
| Kinematic Viscosity @ 100° C. | 11.6 cSt | 11.3 cSt |
| Kinematic Viscosity @ 40° C. | 64.5 cSt | 65.3 cSt |
| Viscosity index | 177 | 166 |
| Cold Cranking Simulator, −25° C. | 2628 cP | 2486 cP |
| Minirotary Viscometer TP-1 @ −30° C. | 6600 cP | 5400 cP |
| Minirotary Viscometer TP-1 Y.S. @ −30° C. | 0 | 0 |
| Scanning Brookfield Viscosity at 30,000 cP | −39.9° C. | <−40° C. |
| Pour Point, ° C. | −54° C. | <−57° C. |
| Simulated Distillation, % off at 700° F. | 10.90% | 2.60% |
| Noack | 11.89% | N.D. |
| 4-Ball Wear Scar, mm | 0.37 | 0.38 |
| Friction Coefficient @ 100° C. | 0.11 | 0.11 |

The data in Table II shows that the motor oil formed from the base oil of Example 4 is comparable in characteristics and performance to the more expensive synthetic PAO oil.

EXAMPLE 7

The hydrogenated cracked oil obtained in Example 4 was further fractionated into 2 cSt, 4 cSt and 6 cSt base oils. Their physical properties are shown in Table III.

TABLE III

| Property | 2 cSt Oil | 4 cSt Oil | 6 cSt Oil |
|---|---|---|---|
| Viscosity, cSt |  |  |  |
| 100° C. | 1.9 | 4.05 | 6.1 |
| 40° C. | 5.98 | 17.3 | 31.6 |
| Viscosity Index | 106 | 137 | 145 |
| Cold Cranking Simulator, −25° C. | N.D. | 670 | 1930 |
| Pour Point, ° C. | <−60 | −27 | −27 |
| Flash Point, ° C. | 146 | 207 | 246 |
| Fire Point, ° C. | N.D. | 259 | 282 |
| Sp. Gr. | 0.797 | 0.815 | 0.823 |
| Bromine Number | <0.1 | <0.1 | <0.1 |
| GPC, Mn | 326 | 606 | 761 |
| GPC, Mw/Mn | 1.07 | 1.05 | 1.15 |
| NOACK, wt % | 99.6 | 15.2 | 7.1 |
| Simulated Distillation, % off at 700° F. | 96.5 | 0 | 1.2 |
| 1% | 561 | 730 | 694 |
| 5% | 577 | 752 | 747 |
| 10% | 592 | 761 | 786 |
| 20% | 604 | 775 | 838 |
| 50% | 637 | 804 | 883 |
| 90% | 680 | 820 | 927 |
| 95% | 693 | 853 | 972 |
| 99% | 730 | 869 | 1101 |

TABLE III-continued

| Property | 2 cSt Oil | 4 cSt Oil | 6 cSt Oil |
|---|---|---|---|
| PDSC Oxidation Test (500 psig O2) Base oil. @ 165° C., minutes | 20 | 18.4 | 18.8 |
| Containing 10% DI, @ 195° C., min | 25.8 | 49.9 | 50.1 |

EXAMPLE 8

Ethylene/Propylene/1-Butene Terpolymer

This experiment was carried out in a similar manner as Example 1, except that the reaction was a batch reaction. A 1-liter autoclave reactor was thoroughly purged with nitrogen and then charged with 300 ml of dried toluene. Through the mass flow controller, ethylene, propylene, 1-butene and hydrogen were fed into the reactor at a ratio of 4000 cc/min, 3600 cc/min, 400 cc/min, and 400 cc/min, respectively. Methyl aluminoxane in toluene solution, 46.9 mg-atom, as aluminum atom, and 0.015 mg-atom, as Zr atom, of bis(isopropylcyclopentadienyl)zirconium dichloride in toluene solutions were injected at 50° C. and 15 psig pressure. After 3 hours, the reaction was quenched with 1% aq. HCl, then washed with aqueous 1 M NaOH, followed by a large quantity of water. After stripping off toluene, the reaction gave 348 grams of liquid terpolymer. The polymerization conditions and physical properties of the reactor product are summarized in Table IV. The crude reactor product was thermally cracked as described in Example 3, followed by distilling off the light polymer through a Vigreux column. The residue was hydrogenated with 1 wt % of 10% Pd on active carbon. The final hydrogenated liquid terpolymer had a kinematic viscosity at 100° C. of 9.6 cSt and viscosity index of 158; Mn of 1006, Mw/Mn of 1.24. The composition of the terpolymer, determined by C-13 NMR, was 72 mole % of ethylene, 25 mole % of propylene, and 3 mole % of butene. The physical properties are summarized in Table V.

EXAMPLE 9

The liquid terpolymer was prepared in the same manner as in Example 8, except that the reactor was fed ethylene, propylene, 1-butene and hydrogen at a rate of 4000 cc/min, 3980 cc/min, 995 cc/min, and 540 cc/min, respectively. The polymerization conditions and physical properties of the product are summarized in Table IV.

The reactor product was cracked and hydrogenated in the same manner as in Example 8 to give a colorless liquid of kinematic viscosity at 100° C. of 9.9 cSt and viscosity index of 150. The composition and the physical properties of terpolymer are summarized in Table V.

EXAMPLE 10

Ethylene/Propylene/1-Decene Terpolymer

The liquid terpolymer was prepared in the same manner as Example 8, except that into the reactor was injected 25 mL of 1-decene and ethylene, propylene, and hydrogen at a rate of 4000 cc/min, 3980 cc/min, and 480 cc/min, respectively. The reaction ran for 3 hours and gave 444 grams of liquid terpolymer. The polymerization conditions and physical properties of the product are summarized in Table IV.

The reactor product was cracked and hydrogenated in the same manner as Examples 3 and 4 to give a colorless liquid having a kinematic viscosity at 100° C. of 9.8 cSt and viscosity index of 159. The terpolymer contained 4.2% by weight of 1-decene. The physical properties, summarized in Table V, show the terpolymer has a better (lower) pour point than the copolymer in comparative Example A.

Comparative Example A

The same procedure as Example 10 was followed, except the polymerization was conducted without adding a third olefin. The physical properties of the reactor product and the final hydrogenated cracked liquid terpolymer are outlined in Tables IV and V.

EXAMPLE 11

Ethylene/Propylene/1-Hexene Terpolymer

Ethylene, propylene, and hydrogen were mixed in ratio of 47:53.3:5.2 in a 7 L cylinder to a total pressure of 105.2 psig. The temperature of the cylinder was heated to and maintained at 50° C. for at least 2 hours to mix the gases. Into a 0.5 L autoclave reactor was placed 100 ml of toluene, followed by the gas mixture at 50° C., 15 psig pressure. Two ml of 1-hexene, dried over 4A molecular sieves, was injected into the reactor, followed by the injection of 15 mg-atom, as aluminum atom, of methyl aluminoxane and 0.015 mg-atom, as zirconium atom, of Bis(ipropylcyclopentadienyl) zirconium dichloride in toluene solution. After 3 hours, the polymerization product was quenched with 1% HCl/MeOH, washed with 100 ml 0.5 M aq.NaOH, then water. The solvent was rota-evaporated to give 156 grams of liquid terpolymer. The terpolymer contained 0.9% 1-hexene by weight.

The crude reactor product was cracked in the same manner as described in Example 3. A heart cut of terpolymer was collected overhead at a temperature of 150° C. to 275° C. at 1.5 mm Hg vacuum. The product, 114 grams (82%), was hydrogenated with 1 wt. % of Pd/C as described in Example 4 to give a colorless liquid polymer. The physical properties of the final hydrogenated liquid terpolymer are outlined in Table VI.

EXAMPLE 12

Example 11 was repeated, except that 4 ml 1-hexene was injected as the third monomer. The physical properties of the final hydrogenated liquid terpolymer are outlined in Table VI.

EXAMPLE 13

Example 11 was repeated, except that 20 ml 1-hexene was injected as the third monomer. The physical properties of the final hydrogenated liquid terpolymer are outlined in Table VI.

Comparative Example B

For comparison, the ethylene/propylene copolymer was prepared without adding 1-hexene using the same procedure as described in Example 11. The physical properties of the final hydrogenated liquid copolymer are outlined in Table VI.

TABLE IV

Conditions and Properties of the Reactor Products

| Experiment | Comparative Ex. A | 8 | 9 | 10 |
|---|---|---|---|---|
| Reactor Volume | 1L | 1L | 1L | 1L |
| Solvent, ml | 300 | 300 | 300 | 300 |
| T, °C. | 50 | 50 | 50 | 50 |
| Pressure, psig | 15 | 15 | 15 | 15 |
| Feed: Monomers | | | | |
| Ethylene, cc/min | 4000 | 4000 | 4000 | 4000 |
| Propylene, cc/min | 3980 | 3600 | 3980 | 3980 |
| 1-Butene, cc/min | 0 | 400 | 995 | 0 |
| 1-Decene, ml | 0 | 0 | 0 | 25 |
| Hydrogen, cc/min | 480 | 400 | 540 | 480 |
| Catalysts | | | | |
| MAO, Al mg-atom | 31.3 | 46.9 | 62.6 | 31.3 |
| (i-PrCp)$_2$ZrCl$_2$, Zr mg-atom/h | 0.01 | 0.015 | 0.02 | 0.01 |
| Time, hours | 3 | 3 | 3 | 3 |
| Yield, grams | 311 | 348 | 394 | 444 |
| Kin. Vis., at 100° C., cSt | 113 | 86 | 53 | 43 |
| Kin. Vis., at 40° C. | 1101 | 897 | 496 | 302 |
| Viscosity Index | 202 | 181 | 172 | 200 |
| C2, mole % in polymer | 72 | 71.5 | 67 | N/A |
| C3, mole % in polymer | 28 | 25.4 | 27 | N/A |
| C4, mole % in polymer | 0 | 3 | 6 | 0 |
| Mn | 2196 | 2339 | 1784 | 2129 |
| Mw/Mn | 2.27 | 2 | 2.14 | 2.02 |
| Bromine Number | 2.8 | 2.1 | 2.5 | 22 |
| Sim. Dist. % off at 700° F. | 3.8 | 4.3 | 6.4 | 6.5 |

TABLE V

Physical Properties of the Hydrogenated Liquid Terpolymer

| Experiment | Comparative Ex. A | 8 | 9 | 10 |
|---|---|---|---|---|
| Feed: Monomers | | | | |
| Ethylene, cc/min | 4000 | 4000 | 4000 | 4000 |
| Propylene, cc/min | 3980 | 3600 | 3980 | 3980 |
| 1-Butene, cc/min | 0 | 400 | 995 | 0 |
| 1-Decene, ml | 0 | 0 | 0 | 25 |
| Hydrogen, cc/m | 480 | 400 | 540 | 480 |
| Mole % of C2 | 72 | 72 | 67 | N.D. |
| Mole % of C3 | 28 | 25 | 27 | N.D. |
| Mole % of C4 | 0 | 3 | 6 | 0 |
| Wt % of C$_{10}$ | | | | 4.2 |
| Kinematic Viscosity | | | | |
| at 100° C., cSt | 11.4 | 9.6 | 9.9 | 9.8 |
| at 40° C., cSt | 66.1 | 55.8 | 60.3 | 56.5 |
| Viscosity Index | 166 | 158 | 150 | 159 |
| Pour Point, °C. | −3 | −12 | −24 | −12 |
| Simulated Dist, % off @700° F. | 3.6 | 2.2 | 5.1 | 3.1 |
| Mn | 1086 | 1006 | 1001 | 1028 |
| Mw/Mn | 1.34 | 1.24 | 1.31 | 1.25 |
| Bromine Number | 0.1 | 0.1 | 0.1 | 0.1 |

TABLE VI

Physical Properties of the Hydrogenated C$_2$/C$_3$/C$_6$ Liquid Polymer

| | Example 11 | Example 12 | Example 13 | Comparative Ex. B |
|---|---|---|---|---|
| Wt % of 1-hexene in polymer | 0.9 | 1.5 | 7.5 | 0 |
| Overhead temperature, | 150–275° C./1.5 mm | 150–235° C./1.5 mm | 150–340° C./1.5 mm | 150–280° C./1.5 mm |
| Wt % cut of distillate | 82% | 77% | 80% | 85% |
| Bromine Number | 0.12 | 0.16 | 0.07 | 0.07 |
| Kin. Vis., @ 100° C. | 6.3 cSt | 6.0 cSt | 8.6 cSt | 7.8 cSt |
| 40° C. | 31 cSt | 29.4 cSt | 48.1 cSt | 42.7 cSt |
| Viscosity Index | 161 | 157 | 156 | 157 |
| Simulated Distillation, °F. | | | | |
| 1% BP | 403 | 423 | 473 | 424 |
| 50% BP | 936 | 918 | 955 | 907 |
| Final BP | 1191 | 1141 | 1247 | 1167 |
| % Off @ 700° F. | 12.4 | 9.7 | 9.4 | 13.7 |
| Mn | 853 | 805 | 856 | 856 |
| Mw/Mn | 1.27 | 1.22 | 1.43 | 1.43 |
| Pour Point, °C. | −30° C. | −33° C. | −42° C. | −27° C. |
| Cold Cranking Simulator | | | | |
| @ −20° C., cP | 937 | 885 | 1903 | 980 |
| @ −25° C., cP | 1520 | 1404 | 3219 | 1585 |

EXAMPLES 14–17

Ethylene/Propylene/1-Butene Terpolymer

These examples were carried out in a manner similar to Example 8, except that the feed rates of the monomers were as set forth below in Table VII. Also set forth in Table VII are physical and chemical characteristics of the terpolymers produced.

TABLE VII

Non-cracking E/P/B Terpolymer

| Example | 14 | 15 | 16 | 17 |
|---|---|---|---|---|
| Feed | | | | |
| Ethylene, ml/min | 3600 | 3880 | 4000 | 4000 |
| Propylene, ml/min | 4000 | 4000 | 3000 | 3200 |
| 1-Butene, ml/min | 200 | 200 | 1000 | 800 |
| Hydrogen ml/min | 312 | 240 | 480 | 600 |
| Products Composition | | | | |
| Ethylene, % mole | 65.2 | 69.7 | 73.6 | 73.5 |
| Propylene, % mole | 33.2 | 28.9 | 19.9 | 21.3 |
| Butene, % mole | 1.4 | 1.3 | 6.4 | 5.1 |
| Pour Point, °C. | −33 | −21 | −9 | −6 |
| Mn | 2477 | 2694 | 2547 | 2055 |
| Mw/Mn | 2.12 | 2.23 | 2.01 | 2.16 |
| Bromine Number | 2.3 | 3.2 | 1.3 | 1.0 |
| Kin. Vis. at 100° C., cSt | 107 | 188 | 106 | 70.4 |
| At 40° C., cSt | 1140 | 2286 | 1096 | 625 |
| Viscosity Index | 189 | 204 | 193 | 191 |
| °% Unsaturation | 35.6 | 53.9 | 20.7 | 12.8 |

In addition to their use as base oils, the products of the invention are also useful in applications such as air care, skin care, hair care, cosmetics, household products, cleaners, polishes, fabric care, textile coatings and textile lubricants, automotive products, car cleaners and polishes, fuel additives, oil additives, candles, pharmaceuticals, suspending agents, sun care, insecticides, gels, hydraulic fluids, transmission fluids, modifier for polymers, biodegradable applications and 2-cycle oils.

The invention has been described with reference to certain preferred embodiments. However, as obvious variations thereon will become apparent to those skilled in the art, the invention is not to be considered as limited thereto.

What is claimed:

1. A lubricating oil comprising a liquid or wax-like polymer of ethylene and one or more olefin monomers and at least one oil additive; wherein the polymer is obtainable by polymerizing ethylene and one or more olefin monomers in the presence of a catalyst combination comprising a compound of a transition metal of Group IVb of the Periodic Table and an aluminoxane.

2. The lubricating oil according to claim 1, wherein the olefin monomer contains from 3 to 20 carbon atoms.

3. The lubricating oil according to claim 1, wherein the polymer is a hydroisomerized cracked polymer.

4. The lubricating oil according to claim 1, wherein the polymer is a copolymer.

5. The lubricating oil according to claim 4, wherein the polymer has content of ethylene from about 2 to about 80 mole % and a content of olefin from about 98 to about 20 mole %.

6. The lubricating oil according to claim 4, wherein the copolymer has a content of ethylene from about 4 to about 55 mole % and a content of olefin from about 96 to about 35 mole %.

7. The lubricating oil according to claim 4, wherein the copolymer has a molecular weight >1000.

8. The lubricating oil according to claim 4, wherein the copolymer has a molecular weight <2000.

9. The lubricating oil according to claim 4, wherein the copolymer has a molecular weight greater than 1000 and less than 2000.

10. The lubricating oil according to claim 4, wherein the copolymer has a molecular weight distribution >2.

11. The lubricating oil according to claim 4, wherein the copolymer has a molecular weight distribution <2.5.

12. The lubricating oil according to claim 9, wherein the copolymer has a molecular weight distribution greater than 2 and less than 2.5.

13. The lubricating oil according to claim 1, wherein the polymer is a terpolymer.

14. The lubricating oil according to claim wherein the terpolymer has a content of ethylene from about 10 to about 80 mole %, a first olefin from about 14 to about 80 mole %, and a second olefin from about 1 to about 10 mole %.

15. The lubricating oil according to claim 13, wherein the terpolymer has a molecular weight of from 300 to 10,000.

16. The lubricating oil according to claim 13, wherein the terpolymer has a molecular weight distribution of <2.5.

17. The lubricating oil according to claim 1, wherein the polymer is a cracked polymer having a molecular weight <2000.

18. The lubricating oil according to claim 1, wherein the polymer is a cracked polymer having a molecular weight distribution <2.

19. The lubricating oil according to claim 1, wherein the polymer has a substantially head to tail molecular structure.

20. The lubricating oil according to claim 1, wherein the one or more olefin monomers are vinylidene monomers.

21. The lubricating oil according to claim 20, wherein the vinylidene monomer is alpha-methylstyrene, 2-methyl-1-butene, 2-methyl-1-pentene, or 2-methyl-1-hexene.

22. The lubricating oil according to claim 1, wherein the polymer has a random monomer distribution.

23. The lubricating oil according to claim 1, wherein the one or more olefin monomers are selected from the group consisting of 1 propene, 1-butene, 1-hexene, 4-methyl-1-pentene, 1-octene, 1-decene, 1-dodecene, 1-tetradecene, 1-hexadecene, 1 -octadecene, 1-eicocene, styrene and α-methylstyrene, 2-methyl-1-butene, 2-methyl-1-hexene, 3-methyl-1-butene, 4 methyl-1-pentene, 2-methyl-1-pentene, and 2-methyl-1-propene.

24. The lubricating oil according to claim 13, wherein the terpolymer comprises ethylene, a first olefin and a second olefin different from the first olefin.

25. The lubricating oil according to claim 24, wherein the first olefin is selected from the group consisting of 1-propene, 1-butene, 1-hexene, 4-methyl-1-pentene, 1-octene, 1-decene, 1-dodecene, 1-tetradecene, 1-hexadecene, 1-octadecene, 1-eicocene, styrene and α-methylstyrene, 2-methyl-1-butene, 2-methyl-1-hexene, 3-methyl-1-butene, 4 methyl-1-pentene, 2-methyl-1-pentene, and 2-methyl-1-propene.

26. The lubricating oil according to claim 24, wherein the second olefin is selected from the group consisting of 1-butene, 1-pentene, 1-hexene, 1-heptene, 1-octene, 1-decene, 1 -undecene, 1-dodecene, 2-methyl-1-pentene, styrene, α-methylstyrene, 2-methyl-1-butene, 3-methyl-1-butene, 4-methyl-1-pentene, 2-methyl-1-pentene, 2-methyl-1-propene.

27. The lubricating oil according to claim 13, wherein the terpolymer comprises ethylene, propylene and 1-butene.

28. The lubricating oil according to claim 13, wherein the terpolymer comprises ethylene, propylene and 1-hexene.

29. The lubricating oil according to claim 13, wherein the terpolymer comprises ethylene, propylene and 1-decene.

* * * * *